United States Patent
Zhu et al.

(10) Patent No.: US 10,263,409 B2
(45) Date of Patent: Apr. 16, 2019

(54) CABLE CONNECTING ASSEMBLY

(71) Applicant: Amphenol Fiber Optic Technology (Shenzhen) Co., Ltd., Shenzhen, Guangdong Province (CN)

(72) Inventors: Linghua Zhu, Shenzhen (CN); Songsheng Li, Shenzhen (CN); Xuewu Lei, Shenzhen (CN); Jinan Zhou, Shenzhen (CN)

(73) Assignee: AMPHENOL FIBER OPTIC TECHNOLOGY (SHENZHEN) CO., LTD., Shenzhen, Guangdong Province (CN)

( * ) Notice: Subject to any disclaimer, the term of this patent is extended or adjusted under 35 U.S.C. 154(b) by 271 days.

(21) Appl. No.: 15/443,617

(22) Filed: Feb. 27, 2017

(65) Prior Publication Data

US 2018/0123336 A1    May 3, 2018

(30) Foreign Application Priority Data

Oct. 31, 2016   (TW) .............................. 105216554 U

(51) Int. Cl.
  *H02G 15/04*   (2006.01)
  *F16L 5/06*   (2006.01)

(52) U.S. Cl.
  CPC .............. *H02G 15/04* (2013.01); *F16L 5/06* (2013.01)

(58) Field of Classification Search
  CPC .. H01R 13/59; H01R 13/5202; H01R 13/436; H01R 25/003; H01R 9/0524; H01R 143/26; H02G 15/013; H02G 15/04
  See application file for complete search history.

(56) References Cited

U.S. PATENT DOCUMENTS

| | | | | |
|---|---|---|---|---|
| 5,927,892 A * | 7/1999 | Teh-Tsung | ........... | H02G 3/0675 403/259 |
| 6,409,179 B1 * | 6/2002 | Daoud | ....................... | F16L 5/06 277/602 |
| 9,583,933 B1 * | 2/2017 | Campbell | .............. | H02G 15/04 |
| 9,772,453 B2 * | 9/2017 | Zhu | ....................... | G02B 6/3825 |
| 9,835,807 B2 * | 12/2017 | Zhu | ....................... | G02B 6/3825 |
| 10,074,928 B1 * | 9/2018 | Zhu | ..................... | H01R 13/5202 |
| 2010/0062628 A1 * | 3/2010 | Steele | .................... | H02G 15/04 439/190 |
| 2013/0230997 A1 * | 9/2013 | Asak | ........................ | H01R 4/20 439/275 |
| 2016/0141853 A1 * | 5/2016 | Findley | ................ | H02G 15/013 174/653 |

* cited by examiner

*Primary Examiner* — Daniel J Wiley
(74) *Attorney, Agent, or Firm* — Muncy, Geissler, Olds & Lowe, P.C.

(57) ABSTRACT

A cable connecting assembly includes a tubular member, a securing member, a seal unit, and a hollow barrel member that defines an accommodating space. The tubular member is disposed in the accommodating space and has two annular grooves. The securing member has a coupling portion abutting against the tubular member and threadedly engaging the barrel member, and an abutment portion abutting against the barrel member. The seal unit includes two first seal rings respectively disposed in the annular grooves and sealingly contacting an inner surface of the barrel member, and a second seal ring sleeved on the coupling portion of the securing member and sealingly contacting the inner surface of the barrel member and the abutment portion of the securing member.

6 Claims, 5 Drawing Sheets

CABLE CONNECTING ASSEMBLY

CROSS-REFERENCE TO RELATED APPLICATION

This application claims priority of Taiwanese Patent Application No. 105216554, filed on Oct. 31, 2016.

FIELD

The disclosure relates to a connecting assembly, and more particularly to a cable connecting assembly.

BACKGROUND

Referring to FIG. 1, a conventional cable connecting assembly 1 is used for being connected to a cable 2, and includes a barrel member 11, a tubular member 12, a connect ring 13, a securing member 14, and a seal ring 15. The barrel member 11 has a hollow main body 111 that has opposite first and second end portions 101, 102, and an external threaded portion 112 that extends from the first end portion 101 away from the second end portion 102 and that is for connecting the cable 2 to another cable or other device (not shown). The second end portion 102 is formed with an internal thread 118. The main body 111 and the external threaded portion 112 cooperatively define an accommodating space 110. The tubular member 12 is disposed in the accommodating space 110, and defines a receiving space 120 for receiving the cable 2 therein. The connect ring 13 abuts against an end of the tubular member 12 which is adjacent to the second end portion 102 of the barrel member 11. The securing member 14 has an abutment portion 141 that abuts against the second end portion 102 of the barrel member 11, and a coupling portion 142 that abuts against the connect ring 13 and that is formed with an external thread 143 threadedly engaging the internal thread 118 of the second end portion 102 of the barrel member 11. The abutment portion 141 and the coupling portion 142 of the securing member 14 cooperatively form a through hole 140 in spatial communication with the receiving space 120. The seal ring 15 is sleeved on the coupling portion 142 of the securing member 14, and sealingly contacts an inner surface of the main body 111 of the barrel member 11 and the abutment portion 141 of the securing member 14, so as to prevent water and moisture in the air from entering into the accommodating space 110 and the receiving space 120 through a space between the abutment portion 141 of the securing member 14 and the barrel member 11.

However, when the conventional cable connecting assembly 1 is used for connecting the cable 2 in a relatively humid environment, the conventional cable connecting assembly 1 fails to prevent water and moisture in the air from entering into the accommodating space 110 and the receiving space 120, which may cause damage to the cable 9. Therefore, there is room for improving the structure of the conventional cable connecting assembly 1.

SUMMARY

Therefore, an object of the disclosure is to provide a cable connecting assembly that can alleviate at least one of the drawbacks of the prior art.

According to the disclosure, the cable connecting assembly is for being connected to a cable, and includes a hollow barrel member, a tubular member, a securing member, and a seal unit.

The barrel member extends in a lengthwise direction, defines an accommodating space, and includes a main body and an extending portion. The main body has a first end portion, and a second end portion opposite to the first end portion in the lengthwise direction and being formed with an internal thread. The extending portion extends from the first end portion away from the second end portion. The accommodating space extends in the lengthwise direction through the main body and the extending portion.

The tubular member is disposed in the accommodating space, and includes a tubular body that defines a receiving space adapted to receive the cable therein, and that has an outer surface formed with two annular grooves spaced apart from each other in the lengthwise direction.

The securing member has a coupling portion and an abutment portion. The coupling portion abuts against the tubular member, and has an external thread threadedly engaging the internal thread of the second end portion of the main body. The abutment portion is connected to the coupling portion, abuts against the second end portion of the main body of the barrel member and is located outside of the accommodating space, and cooperates with the coupling portion to form a through hole. The through hole extends in the lengthwise direction, communicates spatially with the receiving space, and is adapted for extension of the cable therethrough into the receiving space.

The seal unit includes two first seal rings that are respectively disposed in the annular grooves of the tubular member and that sealingly contact an inner surface of the main body of the barrel member, and a second seal ring that is sleeved on the coupling portion of the securing member and that sealingly contacts the inner surface of the main body and the abutment portion of the securing member.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
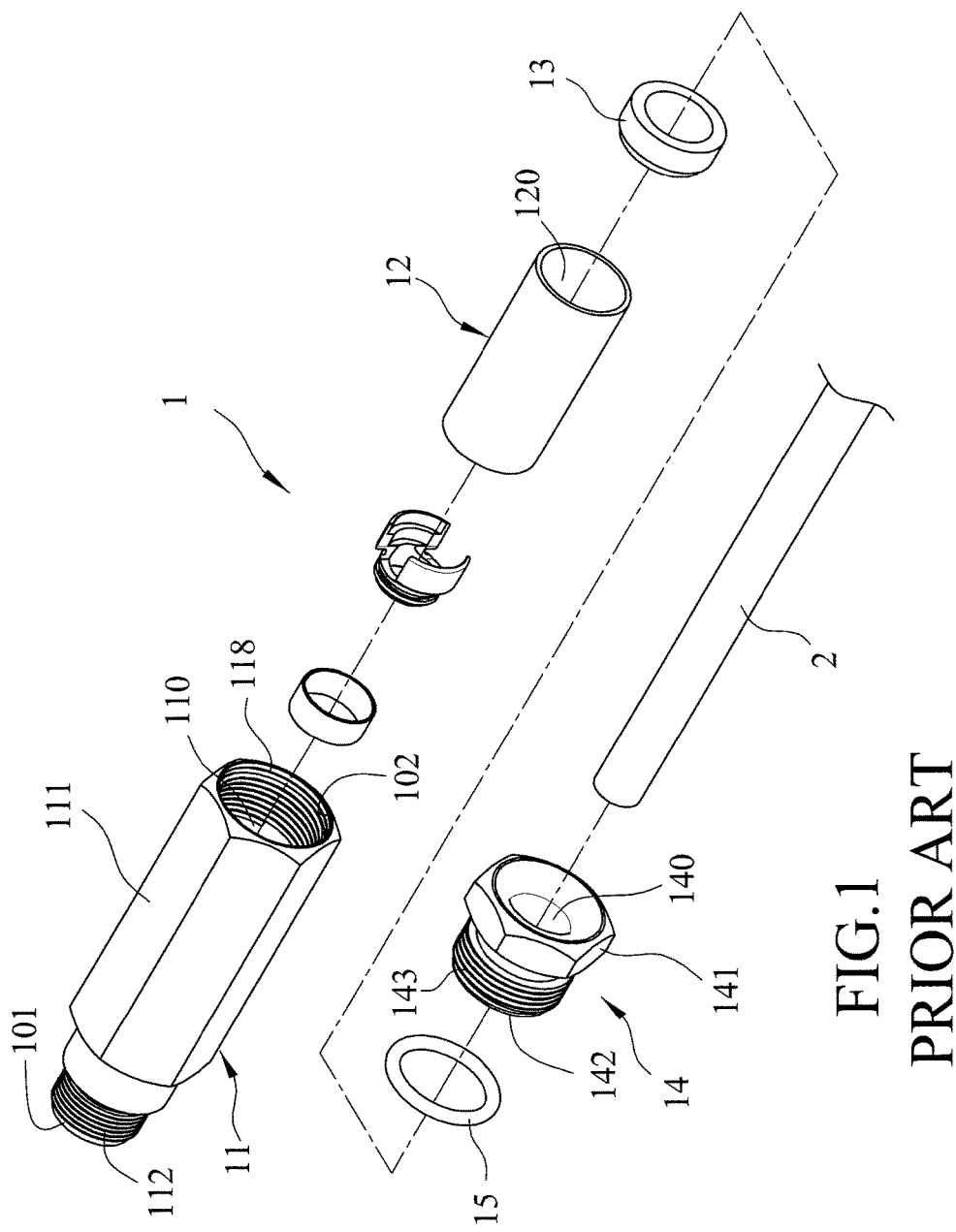
FIG. 1 is a fragmentary exploded perspective view of a conventional cable connecting assembly and a cable.
Figure 2:
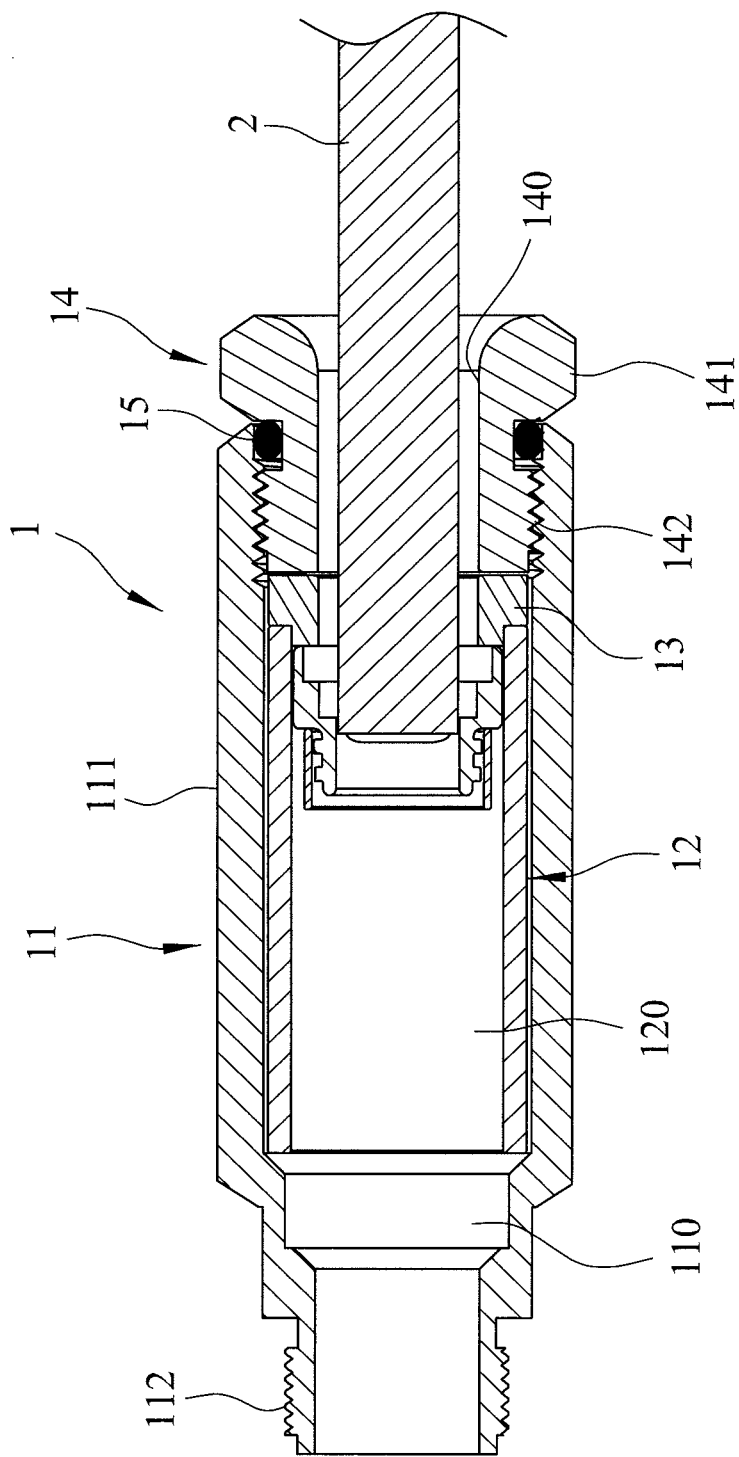
FIG. 2 is a fragmentary assembled sectional view of the conventional cable connecting assembly and the cable.
Figure 3:
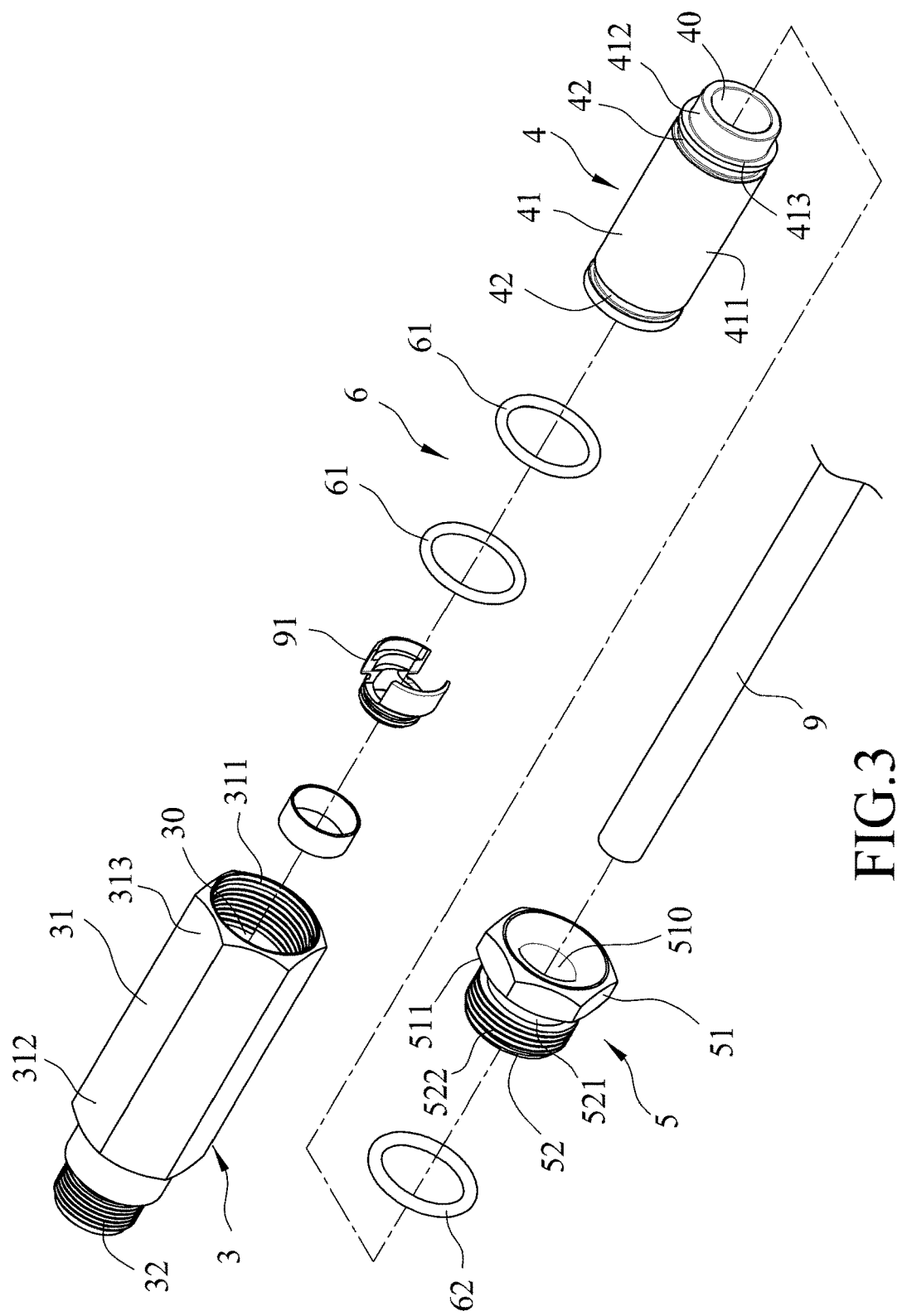
FIG. 3 is a fragmentary exploded perspective view illustrating an embodiment of a cable connecting assembly according to the disclosure and a cable.
Figure 4:
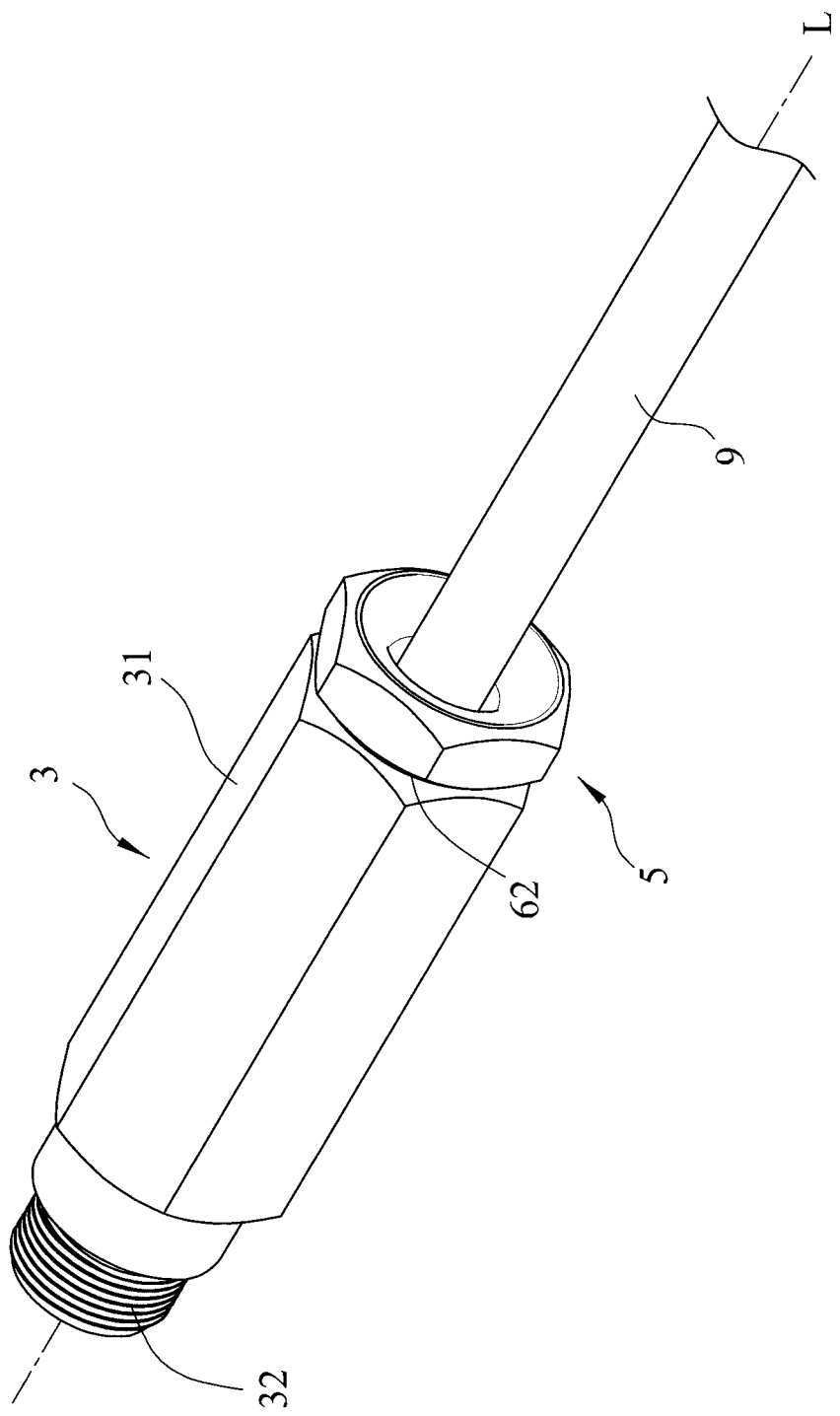
FIG. 4 is a fragmentary assembled perspective view of the embodiment and the cable.
Figure 5:
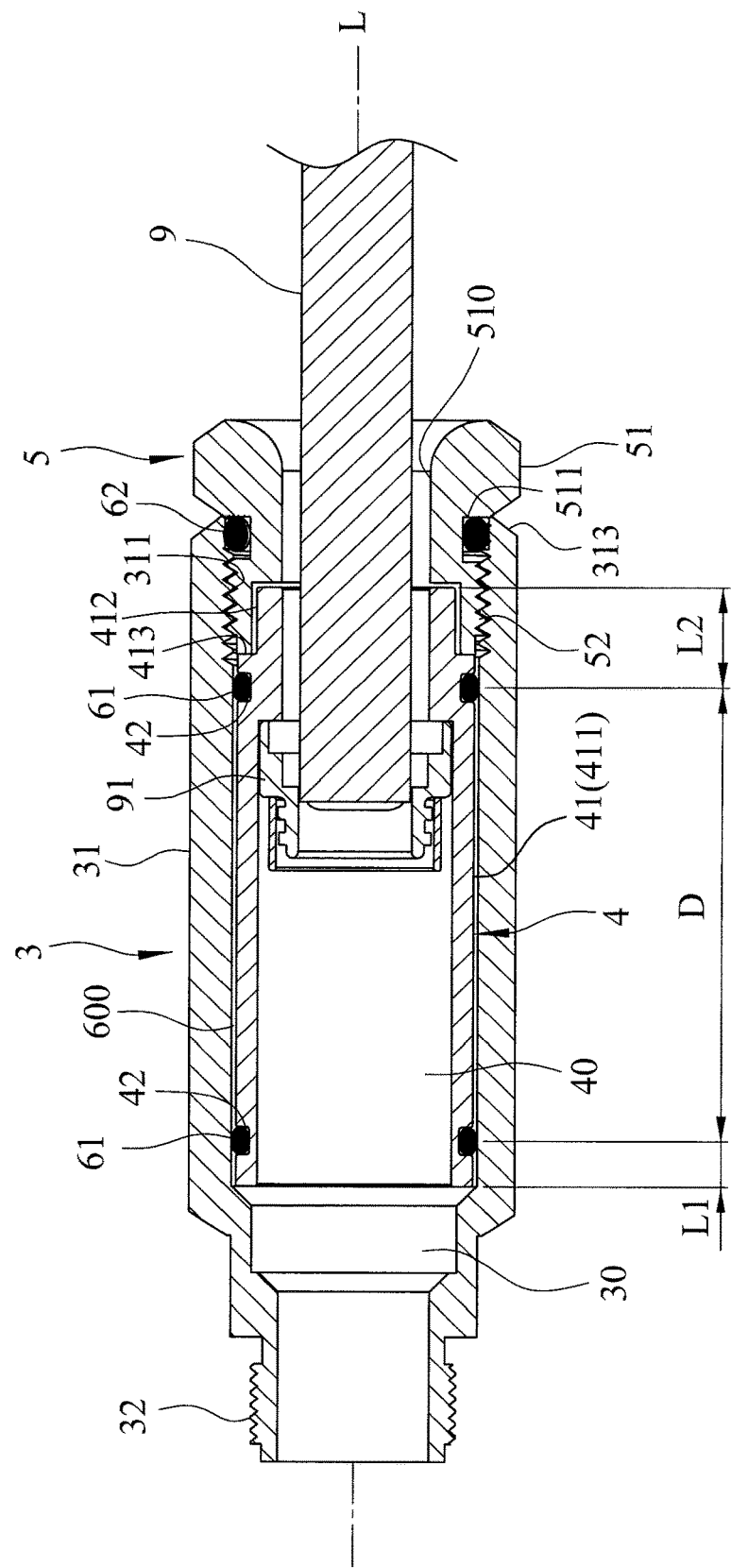
FIG. 5 is a fragmentary assembled sectional view of the embodiment and the cable.

Referring to FIGS. 3 to 5, an embodiment of the cable connecting assembly according to the disclosure is for being connected to a cable 9. The cable connecting assembly includes a hollow barrel member 3, a tubular member 4, a securing member 5, and a seal unit 6.

The hollow barrel member 3 extends in a lengthwise direction (L), defines an accommodating space 30, and includes a main body 31 and an extending portion 32. The main body 31 has a first end portion 312, and a second end portion 313 opposite to the first end portion 312 in the lengthwise direction (L) and being formed with an internal thread 311. The extending portion 32 extends from the first end portion 312 away from the second end portion 313, and has an outer surface formed with an external thread. The accommodating space 30 extends in the lengthwise direction (L) through the main body 31 and the extending portion 32.

The tubular member 4 is disposed in the accommodating space 30, and includes a tubular body 41 that defines a receiving space 40 adapted to receive the cable 9 therein, and that has an outer surface formed with two annular grooves 42 spaced apart from each other in the lengthwise direction (L). The receiving space 40 has opposite open ends in the lengthwise direction (L) such that the cable 9 may extend through the tubular body 41 in the lengthwise direction (L). An end of the cable 9 which extends into the receiving space 40 through one of the open ends is adapted to be connected to another cable (not shown) via a connector 91 disposed in the receiving space 40, or is adapted to extend further through the barrel member 3 via the extending portion 32 to be connected to other device (e.g., a computer terminal) or another cable (not shown). Since such connection is well known to those skilled in the art and is not pertinent to the disclosure, further details of the same will not be described hereinafter.

As illustrated in FIGS. 3 and 5, the tubular body 41 of the tubular member 4 has a main body portion 411 formed with the annular grooves 42, a neck portion 412 spaced apart from the main body portion 411 in the lengthwise direction (L) and having an outer diameter that is smaller than that of the main body portion 411, and a shoulder portion 413 connected between the main body portion 411 and the neck portion 412. In this embodiment, the length of the neck portion 412 is smaller than that of the main body portion 411 in the lengthwise direction (L).

The securing member 5 has a coupling portion 52 and an abutment portion 51 that cooperatively form a through hole 510 extending in the lengthwise direction (L), communicating spatially with the receiving space 40, and being adapted for extension of the cable 9 therethrough into the receiving space 40. The coupling portion 52 has an outer surface formed with an external thread 522 threadedly engaging the internal thread 311 of the second end portion 313 of the main body 31. The outer surface of the coupling portion 52 is further formed with a receiving groove 521 which is annular and which is adjacent to the abutment portion 51. The coupling portion 52 is fittingly sleeved on the neck portion 412 of the tubular body 41 of the tubular member 4, and abuts against the shoulder portion 413 of the tubular body 41. The abutment portion 51 is located outside of the accommodating space 30, and has an abutment surface 511 connected to the coupling portion 52, being adjacent to the receiving groove 521 of the coupling portion 52, and abutting against the second end portion 313 of the main body 31 of the barrel member 3.

The seal unit 6 includes two first seal rings 61 and a second seal ring 62. The first seal rings 61 are respectively disposed in the annular grooves 42 of the tubular member 4, and sealingly contact an inner surface of the main body 31 of the barrel member 3. The barrel member 3, the tubular member 4, and the first seal rings 61 cooperatively form an annular gap 600 being sealed against fluid entry. The second seal ring 62 is sleeved on the coupling portion 52 of the securing member 5, is retained in the receiving groove 521 of the securing member 5, and sealingly contacts the inner surface of the main body 31 of the barrel member 3 and the abutment surface 511 of the abutment portion 51 of the securing member 5.

Referring to FIG. 5, a distance (L1, L2) between each of the first seal rings 61 and an adjacent end of the tubular body 41 of the tubular member 4 in the lengthwise direction (L) is smaller than a distance (D) between the first seal rings 61. That is, the first seal rings 61 are disposed away from a center part of the tubular member 4, so as to define a relatively large annular gap 600 against entry of water and moisture into the receiving space 40. As illustrated, the coupling portion 52 of the securing member 5 tightly abuts against the shoulder portion 413 of the tubular body 41 of the tubular member 4 after the coupling portion 52 of the securing member 5 and the second end portion 313 of the main body 31 of the barrel member 3 threadedly engage each other, which serves as a first barrier against water and moisture entry into the accommodating space 30. The relatively large annular gap 600 defined by the barrel member 3, the tubular member 4, and the two first seal rings 61 serves as a second barrier against water and moisture entry into the receiving space 40. The second seal ring 62 sealingly contacts the inner surface of the main body 31 of the barrel member 3 and the abutment surface 511 of the securing member 5, which further prevents water and moisture from entering into the accommodating space 30. The assembled configuration of the cable connecting assembly provides multiple barriers against water and moisture entry into the accommodating space 30 and the receiving space 40, thereby effectively preventing damage to the cable 9 caused by water and moisture.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A cable connecting assembly for being connected to a cable, said cable connecting assembly comprising:
 a hollow barrel member extending in a lengthwise direction and defining an accommodating space and including
  a main body that has a first end portion, and a second end portion opposite to said first end portion in the lengthwise direction and being formed with an internal thread, and
  an extending portion that extends from said first end portion away from said second end portion, said accommodating space extending in the lengthwise direction through said main body and said extending portion;
 a tubular member disposed in said accommodating space, and including a tubular body that defines a receiving space adapted to receive the cable therein, and that has an outer surface formed with two annular grooves spaced apart from each other in the lengthwise direction;

a securing member having
- a coupling portion that has an external thread threadedly engaging said internal thread of said second end portion of said main body of said barrel member, and that abuts against said tubular member, and
- an abutment portion that is connected to said coupling portion, that abuts against said second end portion of said main body and is located outside of said accommodating space, and that cooperates with said coupling portion to form a through hole extending in the lengthwise direction and communicating spatially with said receiving space, said through hole being adapted for extension of the cable therethrough into said receiving space; and a seal unit including two first seal rings that are respectively disposed in said annular grooves of said tubular member and that sealingly contact an inner surface of said main body of said barrel member, and a second seal ring that is sleeved on said coupling portion of said securing member and that sealingly contacts said inner surface of said main body and said abutment portion of said securing member.

2. The cable connecting assembly as claimed in claim 1, wherein said barrel member, said tubular member, and said first seal rings cooperatively form an annular gap being sealed against fluid entry.

3. The cable connecting assembly as claimed in claim 1, wherein a distance between each of the first seal rings and an adjacent end of said tubular body of said tubular member in the lengthwise direction is smaller than a distance between the first seal rings.

4. The cable connecting assembly as claimed in claim 1, wherein:
- said tubular body of said tubular member has a main body portion formed with said annular grooves, a neck portion spaced apart from said main body portion in the lengthwise direction and having an outer diameter that is smaller than that of said main body portion, and a shoulder portion connected between said main body portion and said neck portion; and
- said coupling portion of said securing member is sleeved on said neck portion of said tubular body and abuts against said shoulder portion.

5. The cable connecting assembly as claimed in claim 1, wherein said abutment portion of said securing member has an abutment surface connected to said coupling portion and abutting against said second end portion of said main body of said barrel member.

6. The cable connecting assembly as claimed in claim 5, wherein said coupling portion of said securing member has an outer surface formed with said external thread, and further formed with a receiving groove which is adjacent to said abutment surface and which retains said second seal ring therein.

* * * * *